(12) United States Patent
Cofta

(10) Patent No.: US 8,417,218 B2
(45) Date of Patent: Apr. 9, 2013

(54) SIM BASED AUTHENTICATION

(75) Inventor: Piotr L Cofta, Ipswich (GB)

(73) Assignee: British Telecommunications PLC, London (GB)

( * ) Notice: Subject to any disclaimer, the term of this patent is extended or adjusted under 35 U.S.C. 154(b) by 0 days.

(21) Appl. No.: 12/293,133

(22) PCT Filed: Feb. 8, 2007

(86) PCT No.: PCT/GB2007/000446
§ 371 (c)(1),
(2), (4) Date: Sep. 16, 2008

(87) PCT Pub. No.: WO2004/079985
PCT Pub. Date: Sep. 16, 2004

(65) Prior Publication Data
US 2009/0068988 A1 Mar. 12, 2009

(30) Foreign Application Priority Data
Mar. 16, 2006 (EP) ...................................... 06251421

(51) Int. Cl.
*H04M 1/66* (2006.01)
(52) U.S. Cl. ........ 455/411; 380/247; 380/274; 713/171; 713/172
(58) Field of Classification Search .................. 370/236, 370/338; 455/410, 411, 552.1; 713/150, 713/151, 155, 168, 169, 171, 172, 185; 380/228, 380/229, 247, 250, 259, 260, 264, 270, 272, 380/277
See application file for complete search history.

(56) References Cited

U.S. PATENT DOCUMENTS
7,239,701 B1 * 7/2007 Ogishi et al. ..................... 380/44
(Continued)

FOREIGN PATENT DOCUMENTS

| EP | 1 624 639 | 2/2006 |
|---|---|---|
| WO | 00/02406 | 1/2000 |
| WO | 2004/079985 | 9/2004 |
| WO | 2004/105340 | 12/2004 |

OTHER PUBLICATIONS

International Search Report for PCT/GB2007/000446, mailed May 10, 2007.
Office Action mailed Jul. 1, 2011, in U.S. Appl. No. 12/161,806, and response thereto.
"Universal Mobile Telecommunications System (UMTS); Generic Authentication Architecture (GAA); Generic bootstrapping architecture," *European Telecommunications Standards Institute*, vol. 3, 3-SA3, No. V720, Dec. 2005, XP014032875.

(Continued)

*Primary Examiner* — Wesley Kim
*Assistant Examiner* — Dinh Nguyen
(74) *Attorney, Agent, or Firm* — Nixon & Vanderhye PC

(57) ABSTRACT

A method of authentication in a communications network, said communications network comprising a network authentication server, a local authentication entity and a user terminal, said local authentication entity comprising a subscriber application and an authentication application, said method comprising the steps of: sending a request from the local authentication entity to the network authentication server to authenticate the user terminal, said request comprising the identity of the user terminal; generating by the network authentication entity an authentication key in response to the request and generating by the subscriber application an identical authentication key; sending the authentication key generated by the network authentication server securely to the user terminal identified by said identity, then storing the authentication key at the user terminal; sending the authentication key generated by the subscriber application securely to the authentication application, then storing the authentication key at the authentication application; and authenticating the user terminal by verifying the authentication key stored at the user terminal with the authentication key stored at the authentication application.

20 Claims, 6 Drawing Sheets

U.S. PATENT DOCUMENTS

| | | | |
|---|---|---|---|
| 2002/0012433 A1* | 1/2002 | Haverinen et al. | 380/247 |
| 2005/0100165 A1 | 5/2005 | Rose et al. | |
| 2005/0190920 A1* | 9/2005 | Ahonen | 380/274 |
| 2005/0251681 A1* | 11/2005 | Robles et al. | 713/172 |
| 2007/0005971 A1* | 1/2007 | Leung et al. | 713/171 |
| 2007/0086591 A1 | 4/2007 | Blom et al. | |

OTHER PUBLICATIONS

"Universal Mobile Telecommunications System (UMTS); 3G Security; Security architecture," *European Telecommunications Standards Institute*, vol. 3, 3-SA3, No. V700, Dec. 2005, XP014032863.
International Search Report issued Jan. 31, 2007, in PCT/GB2006/004033.

\* cited by examiner

SIM BASED AUTHENTICATION

This application is the U.S. national phase of International Application No. PCT/GB2007/000446 filed 8 Feb. 2007 which designated the U.S. and claims priority to EP 06251421.1 filed 16 Mar. 2006, the entire contents of each of which are hereby incorporated by reference.

FIELD OF THE INVENTION

This invention relates generally to the field of authentication of a mobile terminal in a wireless communications network and, more particularly, to methods and systems for providing such authentication by a subscriber identity module.

BACKGROUND OF THE INVENTION

SIM (subscriber identity module) cards are smart cards that are commonly found in mobile phones. Indeed, SIM cards are an essential part of almost all mobile phones operating in a mobile cellular communications network such as GSM or UMTS (Universal Mobile Telecommunications System). In a third generation (3G) networks such as UMTS, the SIM card is capable of holding several applications including the standard SIM application that is used primarily to authenticate the mobile subscriber in the 3G network.

In the past, SIM based authentication in GSM and 3G has always been linked with the mobile cellular network itself. For example, under 3G, SIM based authentication is linked to the home subscriber server (HSS) within the core mobile cellular network. The HSS stores subscriber and authentication information associated with the SIM, and authenticates the SIM, and consequently the mobile phone, by verifying the information stored on the SIM. This is done using a challenge response technique to verify that a shared secret key held securely at both the HSS and on the SIM are the same. Once authenticated, further authentication keys can be generated by the HSS and the SIM so that communications between the HSS, and other entities in the mobile cellular network appropriately authorised by the HSS such as application servers, and the device containing the SIM can be made securely.

However, there are no provisions in existing systems to initiate authentication from the mobile device or SIM itself, and to direct the authentication to other local entities or other devices directly rather than through the HSS or the mobile cellular network.

In fact, there are no provisions in existing systems to use a SIM in a more active way, and specifically ones that utilise the tamper-resistance nature of the SIM as well as its authentication capability in the local environment, such as in a local Wi-Fi network. Existing solutions such as the Generic Authentication Architecture (GAA) under the 3G specifications or the Extensible Authentication Protocol for SIM (EAP-SIM) capitalise on the existing asymmetric relationship between the HSS and the SIM and require the involvement of the network operator in every authentication process and therefore require a connection to the operator's equipment during the actual authentication. Such solutions are not suitable for the local environment where the connection to operator's equipment cannot be always guaranteed or in situations where the operator does not want to be involved as a primary authentication resource once the local network is arranged.

SUMMARY OF THE INVENTION

It is the aim of embodiments of the present invention to address the above-stated problem and to provide an improved SIM driven authentication system and method.

According to one aspect of the present invention, there is provided a method of authentication in a communications network, said communications network comprising a network authentication server, a local authentication entity and a user terminal, said local authentication entity comprising a subscriber application and an authentication application, said method comprising the steps of:

(i) sending a request from the local authentication entity to the network authentication server to authenticate the user terminal, said request comprising the identity of the user terminal;

(ii) generating by the network authentication entity an authentication key in response to the request and generating by the subscriber application an identical authentication key;

(iii) sending the authentication key generated by the network authentication server securely to the user terminal identified by said identity, then storing the authentication key at the user terminal;

(iv) sending the authentication key generated by the subscriber application securely to the authentication application, then storing the authentication key at the authentication application; and (v) authenticating the user terminal by verifying the authentication key stored at the user terminal with the authentication key stored at the authentication application.

Preferably, the local authentication entity further comprises a subscriber identity module (SIM) and the subscriber identity module application and an authentication application are located securely on the subscriber identity module.

The authentication key may be generated by the network authentication server is based on a shared secret key held at both the network authentication server and subscriber application.

The identity sent in the request to the network authentication server may be the international mobile subscriber identity associated with the user terminal.

Preferably, the communications network is a mobile cellular network, but communications between local authentication entity and the user terminal is over a local network and not the mobile cellular network. The local network may be a Wi-Fi network.

Embodiments of the invention allow the SIM in the local authentication entity, which may be for example a home hub, to leverage the existing relationship with the operator of the mobile network to establish a secure and authenticated local network where the SIM in the home hub can act as an authentication centre for other devices with SIMs.

This leverages existing technology of SIM authentication in a mobile network into new network configurations, including local networks that can be created and maintained at a user's home or small business.

This helps ensure secure provisioning during the configuration of a local network or whenever such provisioning becomes necessary, effectively enabling the mobile network operator to act as a supervisor and even manager of the local network. At the same time, it provides for authentication within the local network to occur without the interaction with the mobile network operator so that essential operator's resources, such as the home subscriber server, are not involved in every authentication.

In preferred embodiments, the network authentication server and the user terminal use a session key to secure the sending of the authentication key in step (iii). The session key may be generated by both the network authentication server and the user terminal based on a common secret key held at both the network authentication server and the user terminal.

The authentication key stored at the user terminal in step (iii) may be used to replace the common secret key held at the user terminal.

In another preferred embodiment, the common secret key and the session key are managed by a first subscriber application at the user terminal and the authentication key is managed by a second subscriber application at the user terminal. Preferably, the first subscriber application is associated with the mobile cellular network and the second subscriber application is associated with the local network.

In a second embodiment of the present invention, there is provided a communications network comprising a comprising a network authentication server, a local authentication entity and a user terminal, said local authentication entity comprising a subscriber application and an authentication application, wherein:

the local authentication entity is adapted to send a request to the network authentication server to authenticate the user terminal, wherein said request comprises the identity of the user terminal;

the network authentication server is adapted to generate in response to a request to authenticate from the local authentication entity an authentication key, and to send the authentication key securely to the user terminal identified by the identity in the request;

the user terminal is adapted to store an authentication key sent by the network authentication server;

the subscriber application is adapted to generate an authentication key and to send the authentication key securely to the authentication application; and the authentication application is adapted to store the authentication key sent by the subscriber application and to authenticate the user terminal by verifying the authentication key stored at the user terminal with the authentication key stored at the authentication application.

BRIEF DESCRIPTION OF THE DRAWINGS

For a better understanding of the present invention reference will now be made by way of example only to the accompanying drawings, in which.

DESCRIPTION OF PREFERRED
EMBODIMENTS

The present invention is described herein with reference to particular embodiments. The invention is not, however, limited to such embodiments.

Figure 1:
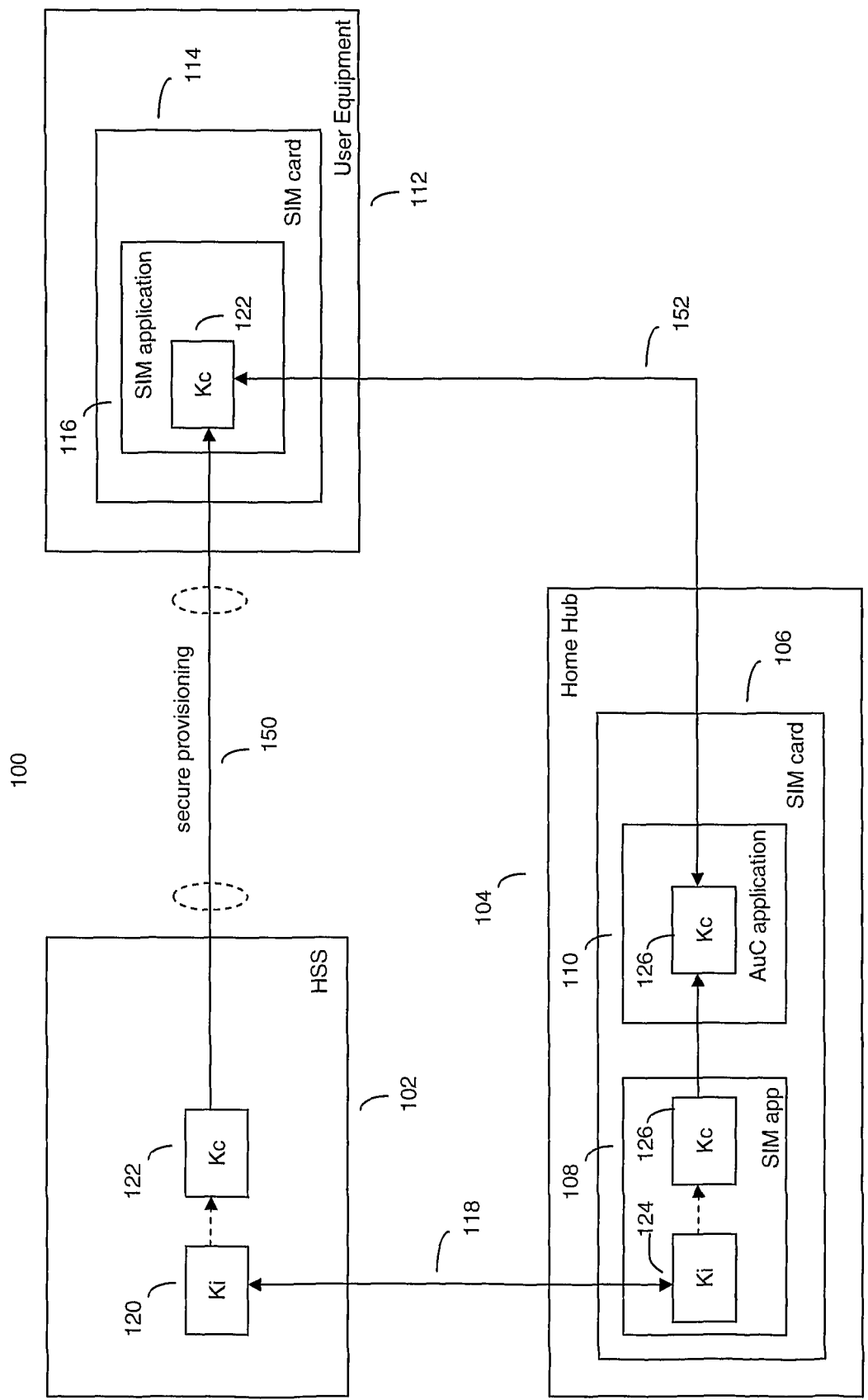
FIG. 1 is a network diagram illustrating a general embodiment of the present invention.

FIG. 1 shows a network arrangement 100 comprising a home subscriber server HSS 102, a home hub 104 and user equipment 112. The HSS 102 is located within a mobile cellular network of a 3G network. The HSS 102 provides security functionality and stores subscriber information associated with the user equipment 112 and the home hub 104. For the sake of simplicity, other elements commonly found in a 3G network have been omitted, such as base stations, radio network controllers and gateways. However, a skilled person will appreciate that such elements may be used during the operation of the network 100 when the HSS 102 communicates with either the home hub 104 or the user equipment 112.

The home hub 104 is a wireless router commonly found in a user's home network. The home hub 104 is a wireless IEEE 802.11 (Wi-Fi) router and has an ADSL connection. The home hub 104 includes a SIM card 106. The SIM card 106 is a tamper resistant module which can hold several applications securely. Those applications can communicate within the SIM card 106 in a manner that guarantees a very high level of security of information exchange, as it is impossible to externally monitor the communications within the SIM card 106. Furthermore, it can be guaranteed that the disclosure of information stored and processed by those applications will be done in a manner that adhere to the security protocols involved. For example, when the SIM card 106 holds a shared secret, it is guaranteed that such a secret is never disclosed in the clear outside of the SIM card 106, so that only the outcome of authentication (that cryptographically uses such secret) can be disclosed, as required by the authentication protocol.

In this example, the SIM card 106 holds two applications: a SIM application 108 and an authentication or AuC application 110. The significance and operation of the AuC application 110 will become apparent during the discussion of a preferred embodiment of the present invention below. The SIM application 108 has securely stored on it a shared secret key Ki 124, an identical copy of which, Ki 120, is stored at the HSS 102.

Authentication of the home hub 104 with the HSS 102 under 3G, and other mobile cellular networks such as GSM, is based upon a key sharing principle. A shared secret key Ki 124 is preloaded onto the SIM application 108 when the SIM card 106 is made, with a further copy of Ki 120 stored at the HSS 102. Thus, Ki is shared a priori between the SIM card 106 in the home hub 104 and the mobile network operator before any communication is initiated. Ki forms the basis for subsequent authentication, key generation and ciphering between the HSS 102 and the home hub 104.

The HSS 102 and the home hub 104 can communicate over communications link 118. Communications link 118 may comprise at least in part an asynchronous digital subscriber line (ADSL) connection as well as the mobile cellular network communication channels of the 3G network. A person skilled in the art will appreciate that other connections can also be used instead of an ADSL connection such as digital subscriber line (DSL), integrated services digital network (ISDN) or even public switched telephone network (PSTN). The communications link 118 also provides the home hub 104 access to other services via the Internet for example, without the need to involve the mobile network.

The user equipment 112 is typically a mobile phone but may be another similar device such as a laptop or PDA. The user equipment 112, like the home hub 104, also comprises a tamper resistant SIM card 114. The SIM card 114 comprises a SIM application 116, which performs a similar authentication function as SIM application 108 in the home hub 104. The user equipment 112 is operable in the 3G network. Therefore, the SIM application 116 can be used to authenticate the user equipment 112 with the home hub 102. The user equipment 112 and the HSS 102 communicate over communications link 150, which adheres to the 3G protocol of the mobile cellular network of the HSS 102, and may comprise at least in part a radio air interface.

The user equipment 112 and the home hub 104 can communicate with each other over communications link 152. Communications link 152 may be any suitable channel such as a IEEE 802.11 (Wi-Fi) channel. Other channels such as WiMax, low power GSM and Bluetooth may also be used. Thus, the user equipment 112 is also adapted to operate in a Wi-Fi environment of similar.

The operation of the HSS 102, the home hub 104 and the user equipment 112 in a preferred embodiment of the present invention will now be described in more detail with reference to FIG. 2. It should be noted that references to like elements in the figures will be made using like reference numerals.

Figure 2:
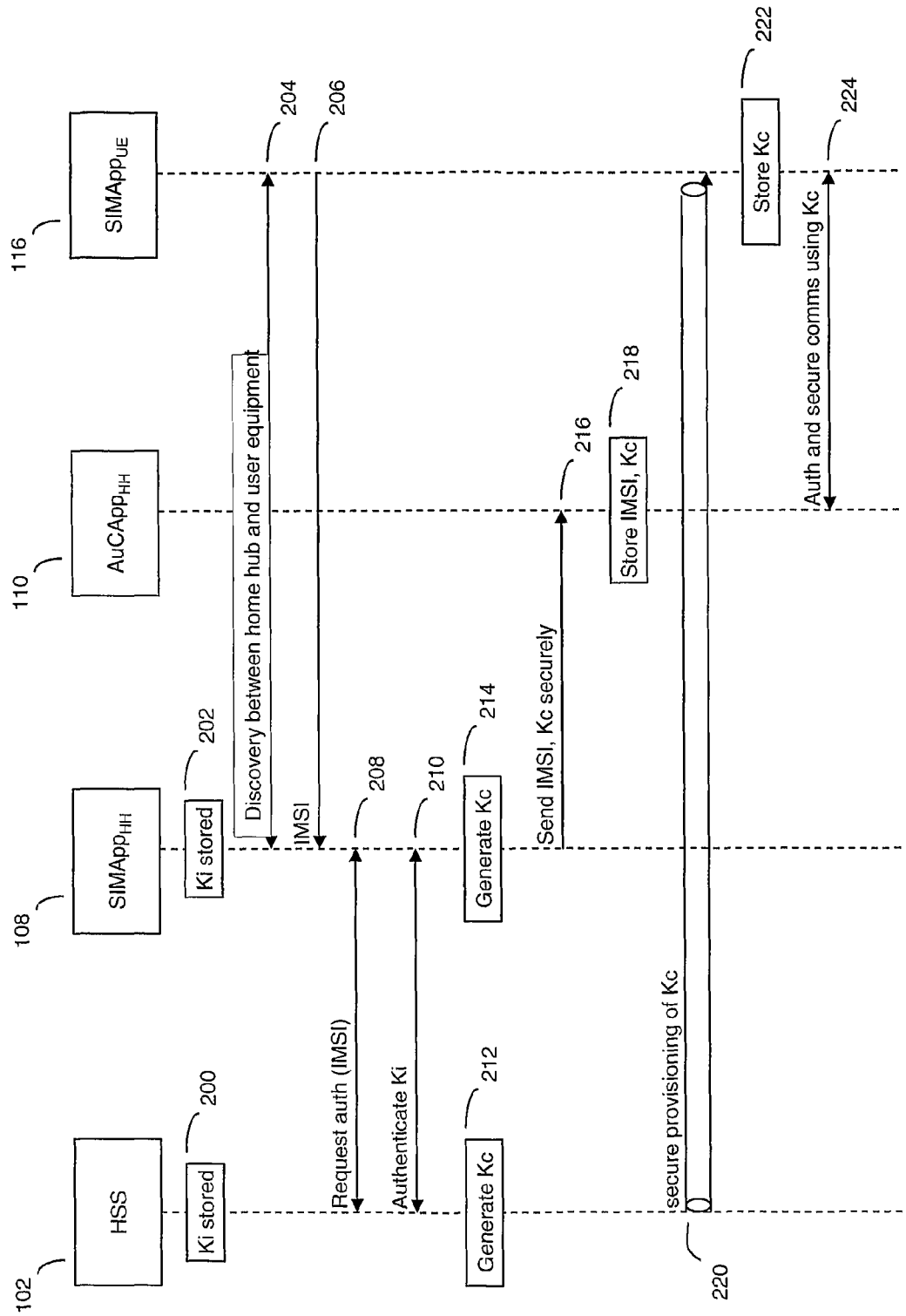
FIG. 2 is a message flow diagram illustrating an embodiment of the present invention.

FIG. 2 illustrates a message flow diagram of an embodiment of the present invention where a home hub 104 is first authenticated by the HSS 102, and then the home hub 104 authenticates the user equipment 112 and secures the communications link 152.

As described earlier, a copy of a shared secret key Ki 120 is stored at the HSS 102 and an identical copy of the same shared secret Ki 124 is stored by the SIM application 108 in the home hub 104 as shown in steps 200 and 202 respectively. The process of mutual authentication between the HSS 102 and the SIM application 108 is based on both parties showing knowledge of the shared secret key Ki in step 204.

In step 204, when the user equipment 112 first enters the Wi-Fi domain of the home hub 104, a discovery process is initiated over the Wi-Fi communications link 152. A skilled person will appreciate that there are various discovery techniques that can be used to identify the user equipment 112 and the home hub 104 to each other.

The result of the discovery process is that the home hub 104 obtains the international mobile subscriber identifier (IMSI) from the SIM card 114 associated with the user equipment 112. Other identifiers may be used instead of the IMSI, as long as the SIM card 114 in the user equipment 112 is uniquely identified. Thus, in step 206, the SIM application 116 in the user equipment 112 sends the IMSI to the SIM application 108 in the home hub 104 as result of the discovery process.

Alternatively, steps 204 and 206 may be replaced by a single step of the user directly inputting into the home hub 102 the IMSI of the user equipment 112. Either way, the home hub 104 determines the identity of the user equipment 112 that it is trying to authenticate and communicate with.

In step 208, the SIM application 108 makes a request to the HSS 102 with the IMSI received in step 206. This request is to generate authentication keys for authenticating the user equipment 112 identified by the IMSI.

Before the HSS 102 and the SIM application 108 both generate a suitable authentication key for authenticating the user equipment 112, authentication between the HSS 102 and the home hub 104 takes place.

In step 210, the HSS 102 generates an authentication vector which includes a random number RAND and a network authentication token AUTN. AUTN is generated based on the shared secret key Ki 120 stored at the HSS 102. The random number RAND and the authentication token AUTN are transmitted to the SIM application 108 in the home hub 104. The SIM application 108 checks AUTN to authenticate the HSS 102, and also calculates, using a fixed authentication algorithm, an authentication response RES based on the received RAND and the shared secret key Ki 124 stored on the SIM application 108. The response RES is transmitted to the HSS 102. If the response RES received by the HSS 102 is the same as the response expected by the HSS based on its own calculations with RAND and its stored copy of the shared secret Ki 120 using the same authentication algorithm, then the home hub 104 is authenticated.

Then, in step 212, the HSS 102 generates an authentication key Kc 122. In step 214, the SIM application 108 also generates an authentication key Kc 126. The authentication key Kc 122 generated by the HSS 102 and the authentication key Kc 126 generated by the SIM application 108 are identical.

The generation of the authentication key Kc is based on the shared secret key Ki and can use one or more of the following methods: selecting parts of the original key, concatenating several keys, applying a one-way (hash) function to the key, applying some logical conversions such as XOR or applying cryptographic algorithms (e.g. DES) to the original key, and taking into consideration the IMSI of the user equipment 112. A person skilled in the art will appreciate that other methods are also possible as long as the same method is used by both the HSS 102 and SIM application 108.

In step 216, the authentication key Kc 126 generated by SIM application 108 and the IMSI of the user equipment 112 is transferred to the AuC application 110. This transfer takes place securely as it occurs internally within the SIM card 106, which is a secure tamper resistant module. As a result, the AuC application 110 can be confident that Kc 126 and IMSI provided by the SIM application 108 will not have been compromised. The AuC application 110 then stores Kc 126 together with the IMSI in step 218. The storing of Kc 126 and the associated IMSI together allows the AuC application 110 to hold multiple authentication keys, one for every user equipment that it wishes to authenticate and communicate with. The presence of the IMSI or similar identifier allows the AuC application 110 to differentiate and manage the different authentication keys.

In step 220, the HSS 102 securely provides the authentication key Kc 122 to the SIM application 116 on the SIM card 114 in the user equipment 112. The HSS 102 knows which user equipment 112 to send Kc 122 to by the IMSI provided in step 208.

It should be noted the securing of the communications channel 150 between the HSS 102 and the user equipment 112 is assumed to have taken place already. This may, for example, be based on a challenge response method based on a shared secret key between the HSS 102 and the user equipment 112 that is common under 3G, which results in the secure encryption of the communications channel 122. Other techniques may be used to secure the channel 150. Once such technique is described below with reference to the embodiment illustrated in FIGS. 3 and 4.

In step 222, the SIM application 104 in the user equipment 112 stores Kc 122. The home hub 104 and the user equipment 112 now share a common authentication key Kc. Therefore, the AuC application 110 in the home hub 104 can authenticate the user equipment 112 based on this authentication key Kc over communications link 152 in step 224.

The method used to authenticate the user equipment is based on the use of authentication vectors like that used to authenticate the HSS 102 and the home hub 104 in step 210. However, any method can be used where Kc 122 in the user equipment 112, is validated against Kc 126 stored in the AuC application 110.

Furthermore, the authentication key Kc may be used to secure the communications link 152 between the home hub 104 and the user equipment 112 either by using it to directly encrypt data transmitted over communications link 152, or using Kc as a basis for deriving an encryption key specifically for such a purpose, similar to the creation of Kc from Ki.

The embodiment described here is particularly beneficial for situations where a new user equipment is brought into the local Wi-Fi network so that the authentication capability must be established between such a device and the home hub before any communication can take place. Other examples of such devices may be a WiFi-enabled phone or media player. In both cases it is essential that the device is properly authenticated so that requests made from such a device (such as the initiation of a premium call or the request for access-restricted content) can be properly processed by the home hub 104. The present embodiment guarantees a strong and convenient method of establishing such capability.

Figure 3:
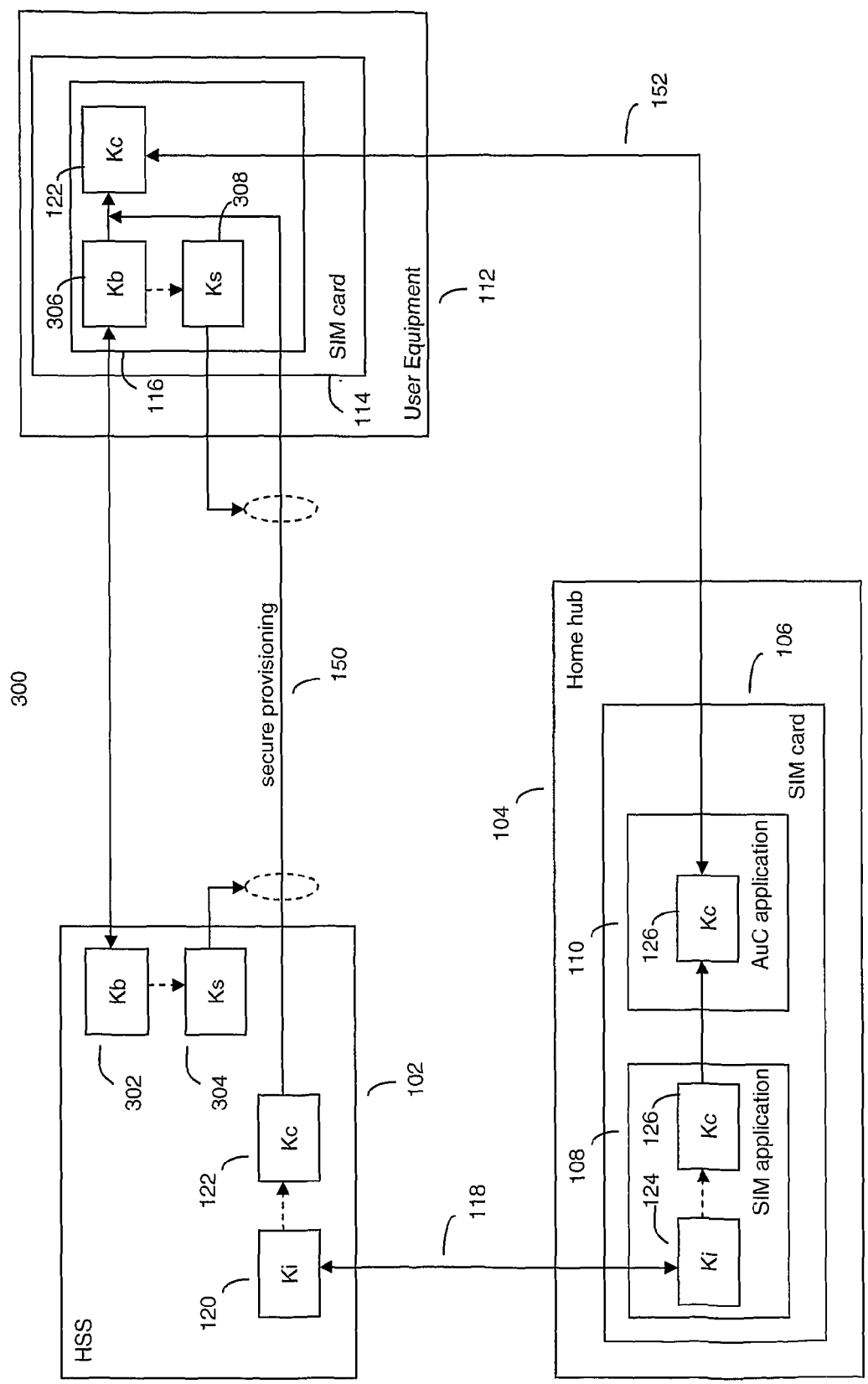
FIG. 3 is a network diagram illustrating another embodiment of the present invention securing the communication link between the home subscriber server and the user equipment.

FIG. 3 shows a network arrangement 300 in an alternative embodiment of the present invention. The network 300, like the network 100 in FIG. 1, comprises a HSS 102, a home hub 104 and a user equipment 112. References to like elements in FIG. 1 and FIG. 3 have been made using like reference numerals. However, the embodiment in FIG. 3 shows in greater detail how the communications link 150 between the HSS 102 and the user equipment 112 can be secured.

Initially, the home hub 102 and the user equipment 112 have stored a common secret key Kb. Kb 302 is stored securely at the HSS 102, and an identical Kb 306 is stored securely in the user equipment 112 in the SIM application 116 of the SIM card 114. This common secret key Kb is similar to that of the shared secret key Ki described in relation to FIG. 1, in that it is shared a priori between the HSS 102 and the SIM application 116. However, Kb may also be shared between the HSS 102 and the SIM application 116 by other means, as long as both the HSS 102 and the SIM application 116 both have identical copies of Kb.

Figure 4:
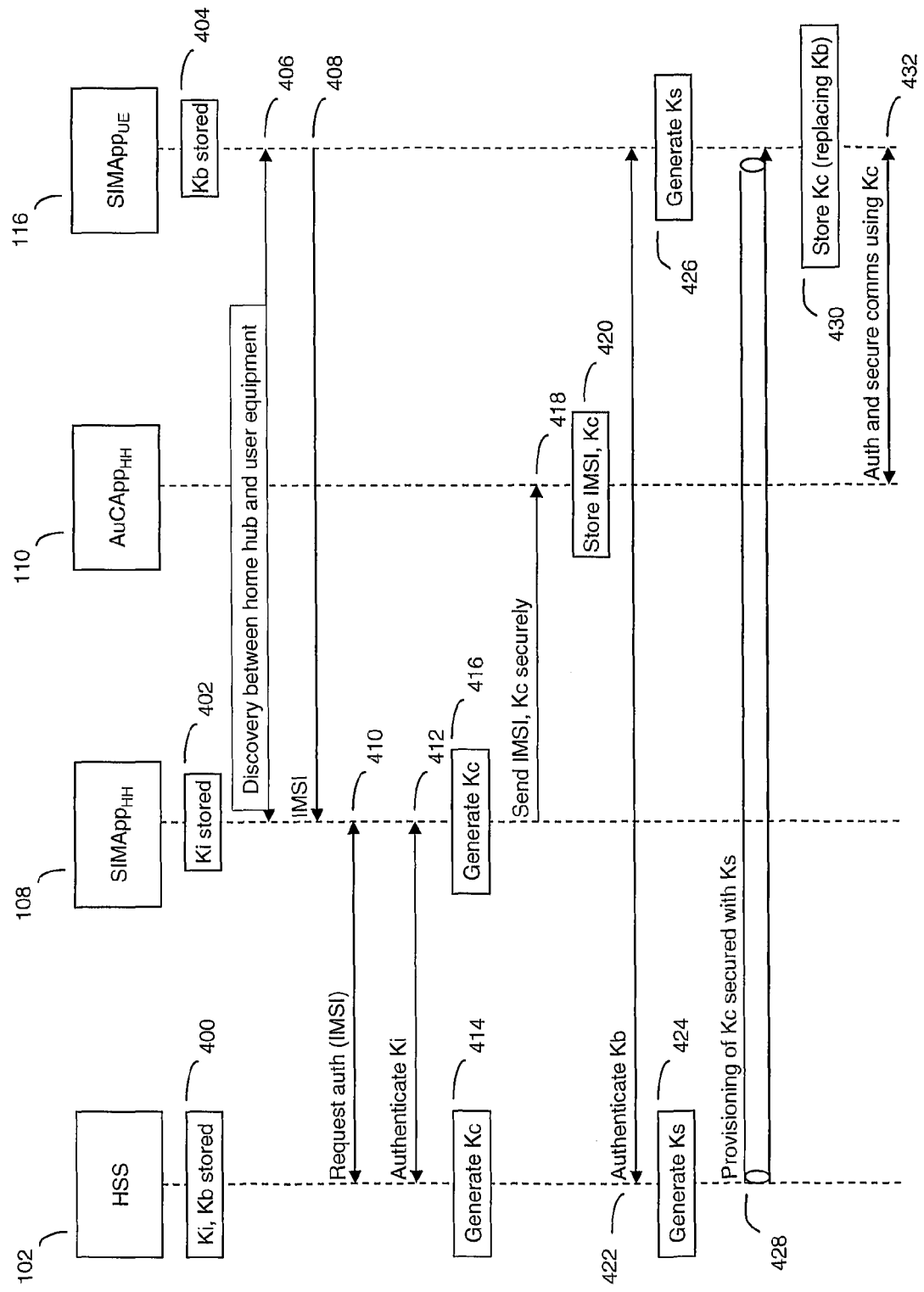
FIG. 4 is a message flow diagram illustrating another embodiment of the present invention.

The operation of the embodiment illustrated in FIG. 3 will now be described in more detail with reference to the message flow diagram of FIG. 4.

In step 400, a copy of Ki 120 and Kb 302 are stored at the HSS 102. In step 402, an identical copy Ki 124 is stored at the SIM application 108 in the home hub 104. In step 404, an identical copy of the common secret key Kb is stored in the SIM application 116 of the user equipment 112.

The process of mutual authentication between the HSS 102 and the SIM application 108 is based on both parties showing knowledge of the shared secret key Ki in step 204. Similarly, the process of authentication and securing the communications link 150 between the HSS 102 and the user equipment 112 will be described in more detail with reference to steps 422 to 428.

Firstly, in step 406, discovery between the home hub 104 and the user equipment 112 takes place. The specific steps that follow which result in the AuC application 110 in the home hub 104 securely receiving and storing the IMSI associated with user equipment 112 and the session key Kc in step 420 are the same as the corresponding steps in FIG. 2. Hence, steps 406 to 420 in FIG. 4 correspond to steps 204 to 218 in FIG. 2.

Then, in step 422, the HSS 102 and the SIM application 116 in the user equipment 112 perform mutual authentication using the common secret key Kb. This process is similar to that of step 210 in FIG. 2, where authentication between the HSS 102 and the home hub 104 takes place using the shared secret Ki. The result of the authentication is that the HSS 102 generates a session key Ks 304 in step 424 and in step 426, the SIM application 116 also generates an identical session key Ks 308.

In step 428, the HSS 102 and the SIM application 116 in the user equipment 112 secure communications link 150 using the session key Ks. This is done by using Ks as a basis for encrypting data transmitted over communications link 150.

Thus, the HSS 102 is then able to securely provide the authentication key Kc 122 to the SIM application 116 of the user equipment 112. The HSS 102 knows which user equipment 112 to send Kc 122 to by the IMSI provided in step 418.

In step 430, the SIM application 116 in the user equipment 112 stores Kc 122. Indeed, and as shown in FIG. 3, Kc can replace the original common secret key Kb.

This embodiment allows mobile network operators (of the HSS 102) to act as a 'white label' issuer of mobile devices. In such a scheme, the operator can fit mobile devices with a SIM card that provides a relationship between the operator and the device, so that the device can be managed and provisioned by the operator over the mobile network for as long as is desired. However, once the device has been passed to the customer, the customer may take over such a relationship if the mobile network operator allows it, so that it is the customer that becomes responsible for the management of the device. This is done by allowing the customer to generate and use its own authentication key Kc in place of the original common secret key Ks in the device.

The home hub 104 and the user equipment 112 now share an authentication key Kc. Therefore, the home hub 104 can authenticate the user equipment 112 based on this authentication key Kc over communications link 152 in step 432 and can also secure the communications link 152 based on this authentication key Kc.

Figure 5:
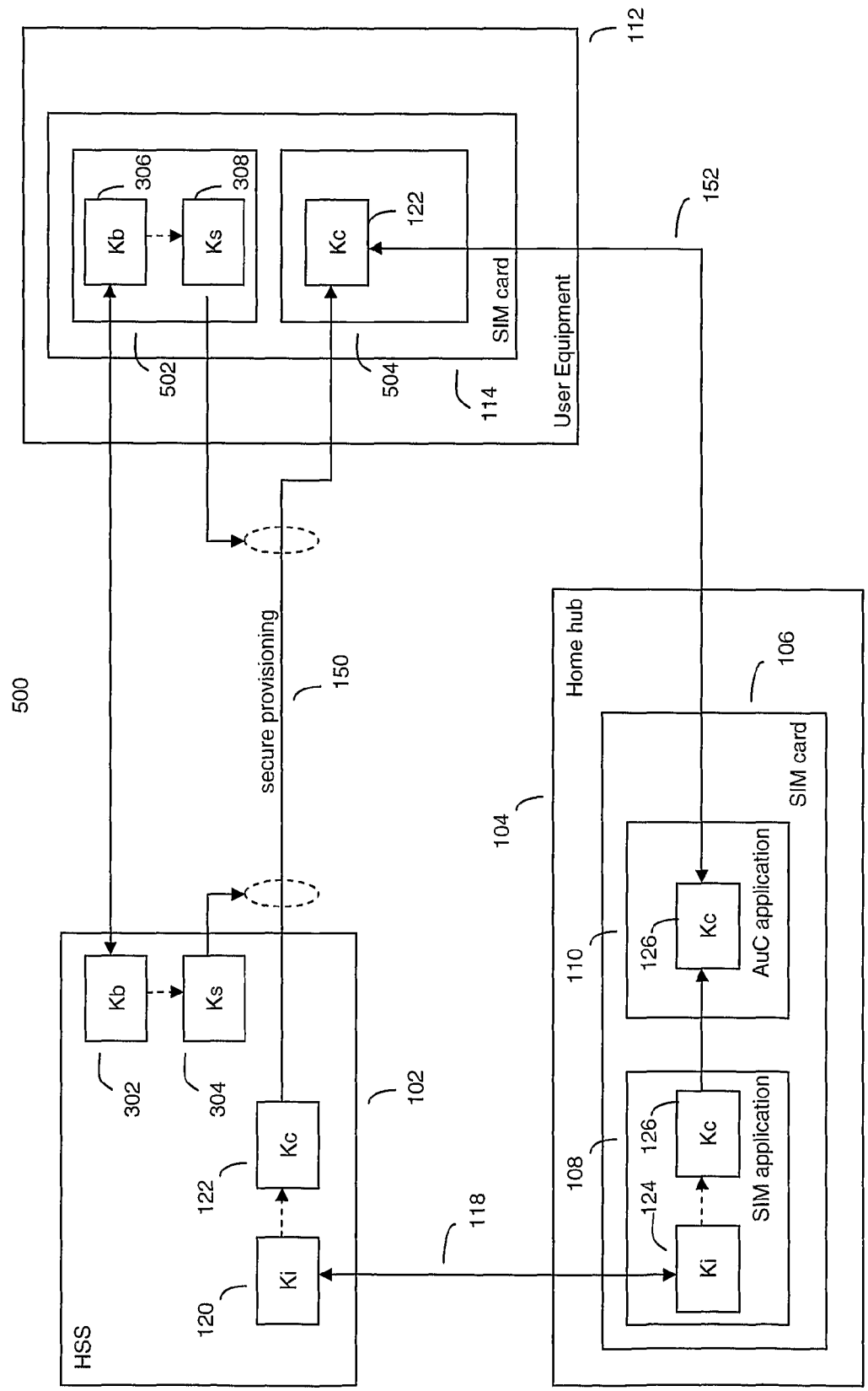
FIG. 5 is a is a network diagram illustrating a further embodiment of the present invention with two independent SIM applications on the user equipment's SIM card.

FIG. 5 illustrates a network arrangement in a further embodiment of the present invention. The network 500, is similar to the network 300 in FIG. 1 and comprises a HSS 102, a home hub 104 and a user equipment 112. References to like elements in FIG. 3 and FIG. 5 have been made using like reference numerals.

The network arrangement but for the SIM card 114 in the user equipment 112 in network 500 now having to SIM applications: SIM application(1) 502 and SIM application(2) 504. The use of two separate SIM applications on a single SIM card allows one SIM application 502 to handle the secure provisioning of communications link 150 using the generated session key Ks as described in FIGS. 3 and 4, whilst the other SIM application 504 can be used to handle the authentication key Kc used for authentication between the home hub 104 and the user equipment 112.

The specific operation of the two SIM applications 502 and 504 will be described in more detail below with reference to FIG. 6.

Figure 6:
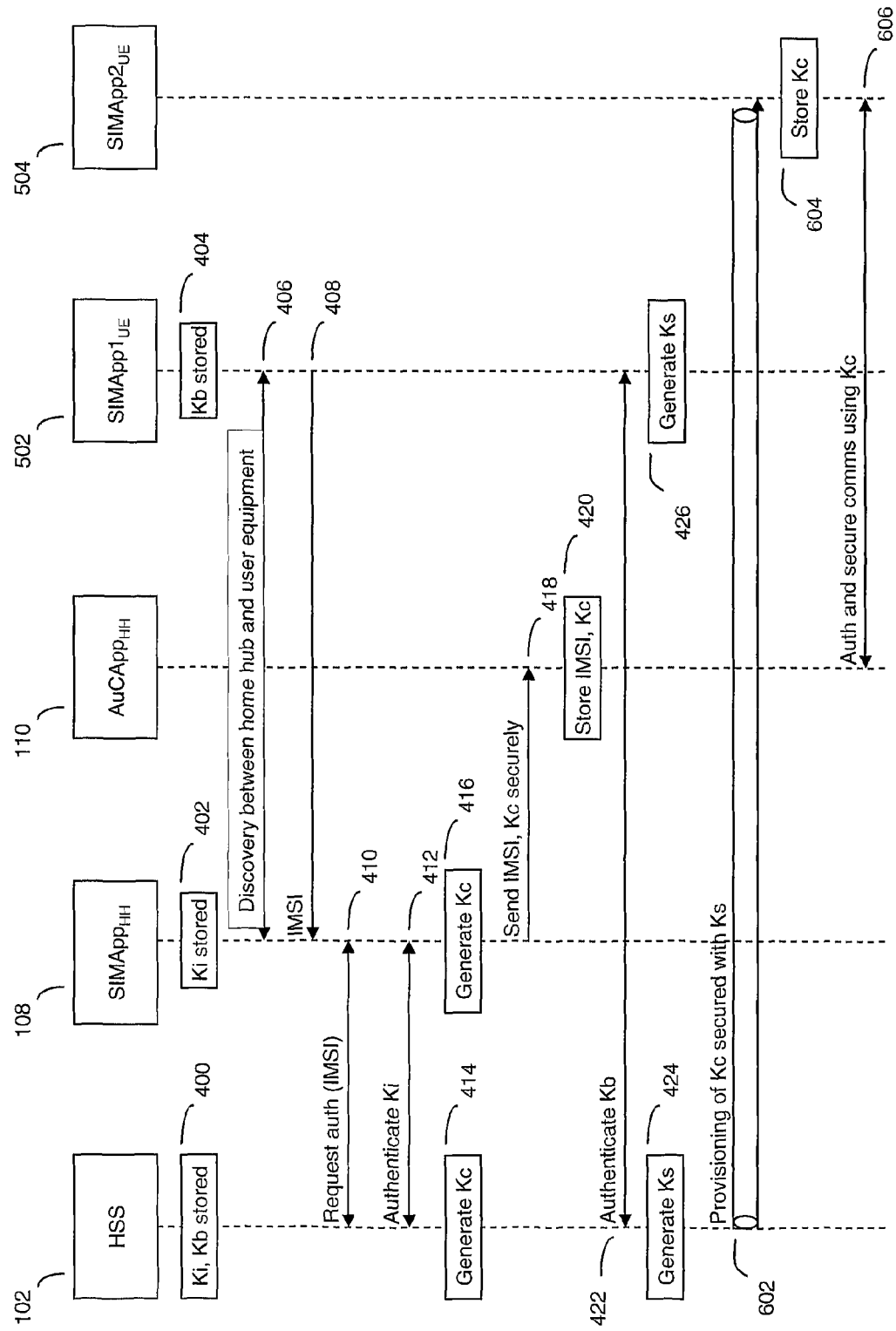
FIG. 6 is a message flow diagram illustrating a further embodiment of the present invention.

FIG. 6 illustrates a message flow diagram where a home hub 104 authenticates a user equipment 112 and subsequently secures the communication link 152 between the two entities. Note that FIG. 6 includes steps 400 to 426, which are identical to the correspondingly numbered steps in FIG. 4. However, in FIG. 6, the SIM application 116 is replaced by SIM application(1) 502. Thus, after step 426 is complete, both the HSS 102 and SIM application(1) 502 will have generated the same session key Ks.

After step 426, the method continues onto step 602, where the HSS 102 uses the generated session key Ks 304 to secure the communications link 150 to the user equipment 112. In step 602, the HSS 102 securely provides to the SIM application(2) 504 the authentication key Kc 122.

Note that the HSS 102 is aware that the SIM card 114 contains two SIM applications 502 and 504 and is also able to determine which application is involved in the authentication process 422 and which one should be provisioned in step 602. The user equipment 112 is capable of identifying from the context of the communication between the HSS 102 and the user equipment 112 that the secure provisioning is associated with the SIM application(2) 504 rather then with the SIM application(1) 502. The HSS 102 may for example include an indicator in the provisioning information that is sent in step 602 that instructs the user equipment 112 to establish the provisioning for SIM application(2) 504.

The SIM application(2) 504 then stores this authentication key Kc 122 securely on the SIM card 114 in step 604.

As in the previous embodiments, the home hub 104 and the user equipment 112 now share an authentication key Kc. Therefore, the home hub 104 can authenticate the user equipment 112 based on this authentication key Kc over communications link 152 in step 606. And as for previous the embodiments, the specific method used for authentication is based on cross validation of Kc stored at the AuC application 110 in the home hub 104 and SIM application(2) 504 in the user equipment 112. Additionally, Kc may be used to secure the communications link 152 between the home hub 104 and the user equipment 112 either by using it to directly encrypt data transmitted over communications link 152, or using Kc as a basis for deriving a specific encryption key for such a purpose.

This embodiment is beneficial for situations where the user equipment might wish to have two identities, so that it can operate in two different networks at the same time. The embodiment allows the mobile network operator to retain the provisioning relationship so that the operator can for example restore the relationship in case of damaged or locked SIM card. Further, the mobile operator is still able to provide communication services to the user equipment when it is outside of the customer's local network, for example through the existing 3G infrastructure. At the same time the customer can have a strong authentication method for the user equipment within the local network so that the customer can securely use the user equipment for sensitive or premium services without the involvement of the mobile network operator.

The above examples have been described with reference to a 3G environment, which includes intra-UMTS and UMTS-GSM arrangements. However, a person skilled in the art will appreciate that the methods can equally be adopted by other types of communications network such as GSM, IEEE 802.11 or the Internet.

It is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of authentication in a communications network, said communications network comprising a network authentication server, a local authentication entity and a user terminal, said local authentication entity comprising a subscriber application and an authentication application, said method comprising:
   (i) sending a request from the local authentication entity to the network authentication server over a first communications channel to authenticate the user terminal, said request comprising the identity of the user terminal;
   (ii) generating by the network authentication entity an authentication key in response to the request and generating by the subscriber application an identical authentication key;
   (iii) sending the authentication key generated by the network authentication server securely over a second communications channel to the user terminal identified by said identity, wherein said second communications channel does not pass through the local authentication entity, then storing the authentication key at the user terminal;
   (iv) sending the authentication key generated by the subscriber application securely to the authentication application, then storing the authentication key at the authentication application; and
   (v) authenticating the user terminal by verifying the authentication key stored at the user terminal with the authentication key stored at the authentication application.

2. A method according to claim 1, wherein the said local authentication entity further comprises a subscriber identity module, and wherein the subscriber application and an authentication application are located securely on the subscriber identity module.

3. A method according to claim 1, wherein the authentication key generated by the network authentication server is derived from a shared secret key held at both the network authentication server and subscriber application.

4. A method according to claim 1, wherein the identity is the international mobile subscriber identity associated with the user terminal.

5. A method according to claim 1, wherein the communications network is a mobile cellular network.

6. A method according to claim 1, wherein the authenticating comprises communications between the local authentication entity and the user terminal over a local network.

7. A method according to claim 6, wherein the local network is a Wi-Fi network.

8. A method according to claim 1, wherein the network, authentication entity and the user terminal use a session key to secure the sending of the authentication key in (iii).

9. A method according to claim 8, wherein the session key is generated by both the network authentication server and the user terminal based on a common secret key held at both the network authentication server and the user terminal.

10. A method according to claim 9, wherein the authentication key stored at the user terminal in (iii) replaces the common secret key held at the user terminal.

11. A method according to claim 8, wherein the common secret key and the session key are managed by a first subscriber application at the user terminal and the authentication key is managed by a second subscriber application at the user terminal.

12. A method according to claim 11, wherein the first subscriber application is associated with the mobile cellular network and the second subscriber application is associated with the local network.

13. A method according to claim 1, wherein the network authentication server is a home subscriber server.

14. A method according to claim 1, wherein the local authentication entity is a wireless router.

15. A method according to claim 1 wherein the user terminal is a mobile phone.

16. A communications network comprising a network authentication server, a local authentication entity and a user terminal, said local authentication entity comprising a subscriber application and an authentication application, wherein:
   the local authentication entity is configured to send a request to the network authentication server over a first communications channel to authenticate the user terminal, wherein said request comprises the identity of the user terminal;
   the network authentication server is configured to generate in response to a request to authenticate from the local authentication entity an authentication key, and to send the authentication key securely over a second communications channel to the user terminal identified by the identity in the request, wherein said second communications channel does not pass through the local authentication entity;

the user terminal is configured to store an authentication key sent by the network authentication server;

the subscriber application is configured to generate an authentication key and to send the authentication key securely to the authentication application; and the authentication application is configured to store the authentication key sent by the subscriber application and to authenticate the user terminal by verifying the authentication key stored at the user terminal with the authentication key stored at the authentication application.

17. A method according to claim 1, wherein the first communications channel is at least in part an xDSL connection and the second communications channel is a cellular mobile connection.

18. A method according to claim 17, wherein the cellular mobile connection is a 3G connection.

19. A method of authentication in a communications network, said communications network comprising a network authentication server, a local authentication entity and a user terminal, said local authentication entity comprising a subscriber application and an authentication application, said method comprising:
(i) sending a request from the local authentication entity to the network authentication server over a first communications channel to authenticate the user terminal, said request comprising the identity of the user terminal; and
(ii) generating by the subscriber application an authentication key that is identical to an authentication key generated by the network authentication entity in response to the request;
(iii) wherein the authentication key generated by the network authentication server is to be sent securely over a second communications channel to the user terminal identified by said identity, wherein said second communications channel does not pass through the local authentication entity, and the authentication key being then stored at the user terminal;
(iv) wherein the authentication key generated by the subscriber application is to be sent securely to the authentication application, and the authentication key is to then be stored at the authentication application; and
(v) wherein the user terminal is to be authenticated by verifying the authentication key stored at the user terminal with the authentication key stored at the authentication application.

20. A method of authentication in a communications network, said communications network comprising a network authentication server, a local authentication entity and a user terminal, said local authentication entity comprising a subscriber application and an authentication application, wherein a request is to be sent from the local authentication entity to the network authentication server over a first communications channel to authenticate the user terminal, said request comprising the identity of the user terminal, the method comprising:
generating by the network authentication entity an authentication key in response to the request, wherein an identical authentication key is be generated by the subscriber application; , and
sending the authentication key generated by the network authentication server securely over a second communications channel to the user terminal identified by said identity, wherein said second communications channel does not pass through the local authentication entity, then storing the authentication key at the user terminal;
wherein the authentication key generated by the subscriber application is to be sent securely to the authentication application, and the authentication key is to be stored at the authentication application; and
wherein the user terminal is to be authenticated by verifying the authentication key stored at the user terminal with the authentication key stored at the authentication application.

* * * * *

UNITED STATES PATENT AND TRADEMARK OFFICE
CERTIFICATE OF CORRECTION

PATENT NO.       : 8,417,218 B2                           Page 1 of 1
APPLICATION NO. : 12/293133
DATED            : April 9, 2013
INVENTOR(S)      : Piotr L Cofta It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 876 days.

Signed and Sealed this

First Day of September, 2015

Michelle K. Lee
*Director of the United States Patent and Trademark Office*